United States Patent
Miyazaki et al.

(10) Patent No.: US 9,982,114 B2
(45) Date of Patent: *May 29, 2018

(54) RUBBER COMPOSITION, RUBBER COMPOSITION FOR TIRES, AND PNEUMATIC TIRE

(71) Applicant: SUMITOMO RUBBER INDUSTRIES, LTD., Kobe-shi, Hyogo (JP)

(72) Inventors: Sumiko Miyazaki, Kobe (JP); Kenya Watanabe, Kobe (JP); Ryo Miyamori, Chiba (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 127 days.

This patent is subject to a terminal disclaimer.

(21) Appl. No.: 15/144,027

(22) Filed: May 2, 2016

(65) Prior Publication Data

US 2016/0340500 A1    Nov. 24, 2016

(30) Foreign Application Priority Data

May 20, 2015 (JP) ................................. 2015-103219

(51) Int. Cl.
| | | |
|---|---|---|
| *C08L 1/10* | (2006.01) | |
| *C08L 7/00* | (2006.01) | |
| *B60C 1/00* | (2006.01) | |
| *C08L 9/06* | (2006.01) | |
| *C08L 21/00* | (2006.01) | |
| *C08J 3/00* | (2006.01) | |
| *C08B 3/20* | (2006.01) | |

(52) U.S. Cl.
CPC .................... *C08L 7/00* (2013.01); *B60C 1/00* (2013.01); *C08B 3/20* (2013.01); *C08J 3/005* (2013.01); *C08L 1/10* (2013.01); *C08L 9/06* (2013.01); *C08L 21/00* (2013.01); *C08J 2307/00* (2013.01); *C08J 2401/10* (2013.01); *C08J 2409/00* (2013.01); *C08L 2205/03* (2013.01); *C08L 2205/08* (2013.01); *C08L 2205/16* (2013.01); *Y02T 10/862* (2013.01)

(58) Field of Classification Search
CPC ....................................................... C08L 1/10
See application file for complete search history.

(56) References Cited

U.S. PATENT DOCUMENTS

| | | | | | |
|---|---|---|---|---|---|
| 4,906,744 | A | * | 3/1990 | Peuscher | ............... C04B 24/383 536/108 |
| 2013/0197131 | A1 | * | 8/2013 | Fujikura | ............... B60C 1/0016 524/9 |
| 2016/0340500 | A1 | * | 11/2016 | Miyazaki | ................. C08J 3/005 |

FOREIGN PATENT DOCUMENTS

| | | | |
|---|---|---|---|
| JP | 2009-84564 A | 4/2009 | |
| JP | 2010-254925 A | 11/2010 | |
| JP | 2013-204010 A | 10/2013 | |
| WO | WO-2013081138 A1 * | 6/2013 | ............... C08B 3/20 |

* cited by examiner

*Primary Examiner* — Vickey Nerangis
(74) *Attorney, Agent, or Firm* — Birch, Stewart, Kolasch & Birch, LLP

(57) ABSTRACT

Provided are a modified cellulose fiber-containing rubber composition and rubber composition for tires that are allowed to simultaneously achieve excellent rigidity, excellent tensile properties, and low energy loss by improving the dispersibility of the cellulose fiber in rubber, as well as a pneumatic tire formed from the rubber composition, having excellent handling stability, excellent rolling resistance properties, and excellent durability. The present invention relates to a modified cellulose fiber-containing rubber composition containing: a modified cellulose fiber (A) obtained by adding a C15 or higher cyclic polybasic acid anhydride (a) containing a hydrophobic group to a cellulose fiber through esterification; a dispersing polymer (B) having a softening point of 135° C. or lower; and a rubber component (C).

8 Claims, No Drawings

RUBBER COMPOSITION, RUBBER COMPOSITION FOR TIRES, AND PNEUMATIC TIRE

TECHNICAL FIELD

The present invention relates to a modified cellulose fiber-containing rubber composition, a rubber composition for tires, and a pneumatic tire formed from the rubber composition.

BACKGROUND ART

Rubber compositions can be reinforced to show higher modulus (complex elastic modulus) by incorporating microfibrillated plant fibers such as cellulose fibers as filler into the rubber compositions. However, since microfibrillated plant fibers are highly self-aggregative and poorly compatible with rubber components, they are less likely to be dispersed in rubber during kneading. For this reason, the incorporation of microfibrillated plant fibers can deteriorate tensile properties or fuel economy in some cases. Therefore, there is a need for methods for improving the dispersibility of microfibrillated plant fibers.

Another problem is that when a water dispersion of cellulose fibers is dried, the cellulose fibers are aggregated, and thus such cellulose fibers cannot be dispersed at the nano level when they are directly mixed with rubber. For this reason, it is difficult to improve tensile strength and to reduce rolling resistance. Methods for solving this problem have been proposed (for example, Patent Literature 1) in which cellulose fibers are dispersed in rubber by dispersing the cellulose fibers in water beforehand and adding rubber latex to the dispersion, followed by stirring and then drying.

Other attempts have been made to improve the dispersibility of cellulose fibers in rubber by using a compatibilizer, by modifying cellulose fibers, or by using a fibrillating resin.

For example, Patent Literature 2 discloses a method for improving the compatibility of microfibrillated cellulose with rubber by chemically modifying the microfibrillated cellulose.

Patent Literature 3 discloses a method for improving the dispersibility of cellulose fibers in a rubber component. According to this method, cellulose fibers are modified by introducing a vinyl group therein, via which a cross linkage can be formed between the cellulose fibers and the rubber component to increase the affinity therebetween.

CITATION LIST

Patent Literature

Patent Literature 1: JP 2013-204010 A
Patent Literature 2: JP 2009-084564 A
Patent Literature 3: JP 2010-254925 A

SUMMARY OF INVENTION

Technical Problem

Various methods for improving the dispersibility of cellulose fibers in rubber have been examined as described above. The method of Patent Literature 1, for example, effectively disperses cellulose fibers; however, the form of rubber used is unfortunately limited to latex form. Also, the methods of Patent Literatures 2 and 3 leave room for improvement because the use of cellulose fibers instead of conventional fillers such as carbon black does not provide advantages in terms of reinforcing properties, cost, and the like.

Accordingly, in order to improve the dispersibility of cellulose fibers in rubber to obtain rubber compositions with excellent tensile properties and low energy loss, further improvements are required.

The present invention aims to solve the above problem and provide a modified cellulose fiber-containing rubber composition and a rubber composition for tires that are allowed to simultaneously achieve excellent rigidity, excellent tensile properties, and low energy loss by improving the dispersibility of the cellulose fiber in rubber, as well as a pneumatic tire formed from the rubber composition, having excellent handling stability, excellent rolling resistance properties, and excellent durability.

Solution to Problem

As a result of intensive studies, the present inventors have found that when a modified cellulose fiber prepared by preliminarily adding a specific acid anhydride containing a hydrophobic group to hydroxyl groups on the surface of a cellulose fiber to enhance the hydrophobicity of the cellulose fiber is kneaded with a dispersing polymer having a specific softening point so that the cellulose fiber is made finer, a rubber composition containing the resulting modified cellulose fiber can be used as a reinforcing material for formed rubber products such as tires to simultaneously achieve excellent rigidity, excellent tensile properties, and low energy loss. Based on this finding, the inventors completed the present invention.

The present invention relates to a modified cellulose fiber-containing rubber composition, containing: a modified cellulose fiber (A) obtained by adding a C15 or higher cyclic polybasic acid anhydride (a) containing a hydrophobic group to a cellulose fiber through esterification; a dispersing polymer (B) having a softening point of 135° C. or lower; and a rubber component (C).

The cyclic polybasic acid anhydride (a) is preferably at least one selected from the group consisting of acid anhydride group-containing petroleum resins and acid anhydride group-containing coal resins.

The dispersing polymer (B) is preferably at least one selected from the group consisting of petroleum resins and coal resins.

The rubber component (C) is preferably at least one selected from the group consisting of natural rubber, modified natural rubbers, synthetic rubbers, and modified synthetic rubbers.

Preferably, the modified cellulose fiber-containing rubber composition contains the modified cellulose fiber (A) in an amount of 0.01 to 30 parts by mass relative to 100 parts by mass of the rubber component (C).

Preferably, the modified cellulose fiber-containing rubber composition is obtained by the steps of: kneading the modified cellulose fiber (A) with the dispersing polymer (B) to give a kneaded mixture, and kneading the kneaded mixture with the rubber component (C).

The present invention also relates to a modified cellulose fiber-containing rubber composition for tires, including the above-described modified cellulose fiber-containing rubber composition.

The present invention also relates to a pneumatic tire, formed from the above-described modified cellulose fiber-containing rubber composition for tires.

Advantageous Effects of Invention

The modified cellulose fiber-containing rubber composition of the present invention contains: a modified cellulose fiber (A) obtained by adding a C15 or higher cyclic polybasic acid anhydride (a) containing a hydrophobic group to a cellulose fiber through esterification; a dispersing polymer (B) having a softening point of 135° C. or lower; and a rubber component (C). This makes it possible to provide a modified cellulose fiber-containing rubber composition and rubber composition for tires, in which the dispersibility of the cellulose fiber in rubber is improved and excellent rigidity, excellent tensile properties, and low energy loss can be simultaneously achieved, as well as a pneumatic tire formed from the rubber composition, having excellent handling stability, excellent rolling resistance properties, and excellent durability. A further advantage is that, in general, when cellulose fibers are incorporated in rubber compositions, the cellulose fibers are aligned in the extrusion direction (in the circumferential direction of the tire), so that the rigidity in the extrusion direction is improved, whereas the rigidity in the direction orthogonal to the extrusion direction (in the radial direction of the tire) is not much improved; in contrast, according to the present invention, excellent rigidity can be achieved not only in the tire circumferential direction but also in the tire radial direction, and therefore the resulting pneumatic tire has greatly excellent handling stability. This effect is presumably due to the good dispersibility of the cellulose fiber in rubber.

Herein, the tire circumferential direction and the tire radial direction specifically refer to the directions shown in, for example, FIG. 1 of JP 2009-202865 A, which is incorporated herein by reference.

DESCRIPTION OF EMBODIMENTS

The modified cellulose fiber (A) used in the present invention is obtained by adding a C15 or higher cyclic polybasic acid anhydride (a) containing a hydrophobic group (hereinafter, also referred to simply as "cyclic polybasic acid anhydride (a)" or "acid anhydride (a)") to a cellulose fiber.

Non-limiting examples of cellulose fibers that can be used to obtain the modified cellulose fiber (A) include plant-derived fibers contained in wood, bamboo, hemp, jute, kenaf, cotton, beet or the like; pulp prepared from the plant-derived fibers; mercerized cellulose fibers; regenerated cellulose fibers such as rayon, cellophane, or lyocell; and celluloses modified with acid anhydrides. Preferred materials for cellulose fibers include wood such as Sitka spruce, *Cryptomeria, Chamaecyparis, Eucalyptus, Acacia*, or the like. Thus, cellulose fibers obtained by fibrillating pulp, paper, or waste paper made from these materials can be suitably used. Each type of these cellulose fibers may be used alone, or two or more types selected therefrom may be used.

Examples of the pulp include those obtained by chemical pulping, mechanical pulping, or chemical and mechanical pulping of the above plant materials, such as chemical pulp (kraft pulp (KP), sulfite pulp (SP)), semichemical pulp (SCP), chemi-ground pulp (CGP), chemi-mechanical pulp (CMP), ground wood pulp (GP), refiner mechanical pulp (RMP), thermomechanical pulp (TMP), or chemi-thermomechanical pulp (CTMP).

The cellulose fiber may be one in which the hydroxyl groups are partially esterified or partially substituted by functional groups such as carboxyl groups as long as properties such as the reactivity and degree of substitution with the C15 or higher cyclic polybasic acid anhydride (a) containing a hydrophobic group, and the compatibility with rubber are not largely affected and a rubber composition with desired properties can be obtained without difficulty. Moreover, the water contained in the cellulose fiber is preferably preliminarily replaced with a solvent such as toluene or N-methylpyrrolidone so as not to inhibit the reaction with the C15 or higher cyclic polybasic acid anhydride (a) containing a hydrophobic group.

The C15 or higher cyclic polybasic acid anhydride (a) containing a hydrophobic group used in the present invention may be any cyclic polybasic acid anhydride that contains a hydrophobic group in the backbone and/or a side chain thereof and has 15 or more, preferably 20 or more carbon atoms. When the number of carbon atoms is less than 15, the modified cellulose fiber (A) does not have good compatibility with rubber, with the result that the rubber composition fails to simultaneously achieve excellent rigidity, excellent tensile properties, and low energy loss. The upper limit of the number of carbon atoms in the C15 or higher cyclic polybasic acid anhydride (a) containing a hydrophobic group is not particularly limited and is, for example, preferably 1,500, more preferably 200, still more preferably 30. When the number of carbon atoms is more than 1,500, the resulting modified cellulose fiber (A) is not readily kneadable with the dispersing polymer (B) and the rubber component (C) and is thus insufficiently dispersed therein, with the result that the rubber composition may fail to simultaneously achieve excellent rigidity, excellent tensile properties, and low energy loss.

The cyclic polybasic acid anhydride (a) contains a hydrophobic group in the backbone and/or a side chain thereof.

The cyclic polybasic acid anhydride may be any polybasic acid anhydride having a cyclic structure formed by dehydration condensation within one molecule of a polybasic acid or between two or more polybasic acids. In particular, it is preferably a polybasic acid anhydride having a cyclic structure formed by dehydration condensation within one molecule of a polybasic acid.

Examples of the polybasic acid include tribasic acids such as aconitic acid or trimellitic acid; and dibasic acids such as succinic acid, itaconic acid, maleic acid, fumaric acid, or citraconic acid. Preferred among these are dibasic acids; more preferred are dicarboxylic acids such as succinic acid, itaconic acid, maleic acid, fumaric acid, or citraconic acid; still more preferred is succinic acid or maleic acid.

Examples of the cyclic polybasic acid anhydride include C4-C10, preferably C4-C6 cyclic carboxylic acid anhydrides, such as succinic anhydride, maleic anhydride, citraconic anhydride, or itaconic anhydride. Among these, succinic anhydride or maleic anhydride can be suitably used because these polybasic acid anhydrides themselves are poorly homopolymerizable and are more readily reactable with hydrophobic groups.

The hydrophobic group in the cyclic polybasic acid anhydride (a) is not particularly limited as long as it has hydrophobicity, and examples include hydrocarbon groups, petroleum resins, and coal resins.

The hydrocarbon group may be linear or branched and is preferably linear in view of the hydrophobicity of the cyclic polybasic acid anhydride (a).

The hydrocarbon group preferably has 11 or more carbon atoms, more preferably 15 or more carbon atoms, and also preferably has 1,500 or less carbon atoms, more preferably 200 or less carbon atoms, still more preferably 30 or less carbon atoms. When the number of carbon atoms in the hydrocarbon group falls within the above range, moderate hydrophobicity can be imparted to the cyclic polybasic acid anhydride (a), and therefore the effects of the present invention can be more suitably achieved.

Examples of the hydrocarbon group include alkyl groups, alkenyl groups, and alkynyl groups. Alkenyl groups are more preferred among these because they can impart moderate hydrophobicity to the cyclic polybasic acid anhydride (a).

Examples of the alkenyl group include dodecenyl, hexadecenyl, and octadecenyl groups. Among these, a hexadecenyl or octadecenyl group is preferred because they can impart moderate hydrophobicity to the cyclic polybasic acid anhydride (a).

The cyclic polybasic acid anhydride (a) containing a petroleum resin as the hydrophobic group means that the cyclic polybasic acid anhydride (a) is an acid anhydride group-containing petroleum resin. Moreover, the cyclic polybasic acid anhydride (a) containing a coal resin as the hydrophobic group means that the cyclic polybasic acid anhydride (a) is an acid anhydride group-containing coal resin. The petroleum resin, acid anhydride group-containing petroleum resin, coal resin, and acid anhydride group-containing coal resin will be described later.

Examples of the C15 or higher cyclic polybasic acid anhydride (a) containing a hydrophobic group include C15 or higher cyclic carboxylic acid anhydrides containing hydrocarbon groups, such as dodecenylsuccinic anhydride, hexadecenylsuccinic anhydride, or octadecenylsuccinic anhydride; acid anhydride group-containing petroleum resins; and acid anhydride group-containing coal resins.

The suitable type of C15 or higher cyclic polybasic acid anhydride (a) containing a hydrophobic group used may be appropriately selected according to the type of rubber component (C) used in the modified cellulose fiber-containing rubber composition of the present invention. It is also one of suitable embodiments of the present invention that the cyclic polybasic acid anhydride (a) is at least one selected from the group consisting of acid anhydride group-containing petroleum resins and acid anhydride group-containing coal resins, and more preferably an acid anhydride group-containing petroleum resin.

The acid anhydride group-containing petroleum resin refers to a C15 or higher petroleum resin containing an acid anhydride ring obtained by grafting a cyclic polybasic acid anhydride with a petroleum resin using a known grafting reaction. Moreover, the acid anhydride group-containing coal resin refers to a C15 or higher coal resin containing an acid anhydride ring obtained by grafting a cyclic polybasic acid anhydride with a coal resin similarly using a known grafting reaction.

For example, these resins can be obtained by grafting a petroleum resin or coal resin with a cyclic polybasic acid anhydride (for example, maleic anhydride) using an organic peroxide, followed by purification. An organic solvent which does not react with the cyclic polybasic acid anhydride may be used in the grafting reaction. Whether the resulting product is an acid anhydride group-containing petroleum resin or coal resin can be confirmed by the change in the acid value of the petroleum resin or coal resin before and after the reaction and purification.

Examples of the petroleum resin include C5 petroleum resins, C9 petroleum resins, C5/C9 petroleum resins, dicyclopentadiene resin, and hydrides of the foregoing resins. Each of these may be used alone, or two or more types of these may be used in combination. C5/C9 petroleum resins are particularly preferred among these.

Examples of the coal resin include coumarone resin, coumarone-indene resin, and hydrides of the foregoing resins. Each of these may be used alone, or two or more types of these may be used in combination.

Any cyclic polybasic acid anhydride may be used to obtain the acid anhydride group-containing petroleum resin or coal resin, as long as it is grafted with a petroleum resin or coal resin to give a petroleum resin or coal resin having an acid anhydride ring. It may be any cyclic polybasic acid anhydride that contains a carbon-carbon unsaturated bond to promote the grafting reaction. Examples include carbon-carbon unsaturated bond-containing C4-C10, preferably C4-C6, cyclic carboxylic acid anhydrides such as maleic anhydride, citraconic anhydride, or itaconic anhydride. In view of grafting reactivity with petroleum resins or coal resins, maleic anhydride is suitable among these.

Examples of the organic peroxide include t-butyl peroxide, t-butyl peroxypivalate, dilauroyl peroxide, 1,1,3,3-tetramethylbutyl peroxy-2-ethylhexanate, t-butyl peroxy-2-ethylhexanate, dibenzoyl peroxide, t-butyl peroxylaurate, dicumyl peroxide, and di-t-hexyl peroxide. Suitable among these are dialkyl peroxides and dicumyl peroxide. Moreover, examples of the organic solvent include saturated aliphatic hydrocarbons such as hexane, heptane, or octane; saturated alicyclic hydrocarbons such as cyclohexane, methylcyclohexane, ethylcyclohexane, cycloheptane, or methylcycloheptane; aromatic hydrocarbons with no ethylenic double bond such as toluene, xylene, or ethylbenzene; alkylene glycol alkyl ether alkylates such as ethylene glycol monoethyl ether acetate, ethylene glycol monobutyl ether acetate, or propylene glycol monomethyl ether acetate; dialkylene glycol alkyl ether alkylates such as diethylene glycol monoethyl ether acetate or diethylene glycol monobutyl ether acetate; and alkyl alkylates such as ethyl acetate, propyl acetate, butyl acetate, ethyl propionate, propyl propionate, or butyl propionate. Suitable among these are alkyl alkylates, alkylene glycol alkyl ether alkylates and dialkylene glycol alkyl ether alkylates.

The molecular weight of the acid anhydride group-containing petroleum resin or coal resin is not particularly limited. The acid anhydride group-containing petroleum resin or coal resin preferably has a polystyrene equivalent weight average molecular weight measured by gel permeation chromatography of 400 to 20,000, more preferably 500 to 9,000, still more preferably 600 to 6,000. When the weight average molecular weight is less than 400, the modified cellulose fiber (A) is not compatible well with rubber, with the result that the rubber composition may fail to simultaneously achieve excellent rigidity, excellent tensile properties, and low energy loss. When the weight average molecular weight is more than 20,000, such a resin usually has a higher viscosity and, accordingly, the resulting modified cellulose fiber (A) is not readily kneadable with the dispersing polymer (B) and the rubber component (C) and is thus insufficiently dispersed therein, with the result that the rubber composition may fail to simultaneously achieve excellent rigidity, excellent tensile properties, and low energy loss.

The modified cellulose fiber (A) is obtained by adding a C15 or higher cyclic polybasic acid anhydride (a) containing a hydrophobic group to a cellulose fiber through esterification (modification reaction). The esterification reaction may be carried out by any method, including conventional methods for esterification. For example, either of the methods described below may be used. The thus prepared modified cellulose fiber (A) is usually filtered and washed with water or the like to remove the solvent and catalyst before use in the preparation of a modified cellulose fiber-containing rubber composition.

(I) The C15 or higher cyclic polybasic acid anhydride (a) containing a hydrophobic group is added sequentially or at one time to a dispersion of a cellulose fiber which has preliminarily been subjected to solvent replacement, followed by reaction.

(II) The C15 or higher cyclic polybasic acid anhydride (a) containing a hydrophobic group is melted and then mixed with a cellulose fiber, followed by reaction.

The ratio of the acid anhydride (a) added to the cellulose fiber is preferably 5% to 150% by mass, more preferably 10% to 100% by mass, in view of addition efficiency and affinity with rubber.

The ratio of the acid anhydride (a) added to the cellulose fiber can be calculated as in the examples described later.

The dispersing polymer (B) used in the present invention has a softening point of 135° C. or lower as measured by a ring and ball method in accordance with JIS K 2207. When the softening point is higher than 135° C., the modified cellulose fiber (A) is not readily kneadable with the rubber component (C) which forms a matrix in the preparation of a modified cellulose fiber-containing rubber composition, and is thus insufficiently dispersed therein, with the result that the rubber composition fails to simultaneously achieve excellent rigidity, excellent tensile properties, and low energy loss. When the softening point is lower than 40° C., the rubber composition itself has a lower softening point and therefore may fail to simultaneously achieve excellent rigidity, excellent tensile properties, and low energy loss. The dispersing polymer (B) preferably has a softening point of 120° C. or lower, more preferably 110° C. or lower. In view of dispersibility, the softening point is preferably 40° C. or higher, more preferably 60° C. or higher, still more preferably 80° C. or higher.

The molecular weight of the dispersing polymer (B) is not particularly limited. It preferably has a polystyrene equivalent weight average molecular weight measured by gel permeation chromatography of 400 to 20,000, more preferably 500 to 9,000, still more preferably 600 to 6,000. The dispersing polymer (B) having a weight average molecular weight of less than 400 may cause plasticization of the rubber composition or the formation of air bubbles during forming, with the result that the rubber composition may fail to simultaneously achieve excellent rigidity, excellent tensile properties, and low energy loss. When the weight average molecular weight is more than 20,000, such a resin usually has a higher viscosity and thus is not readily kneadable with the modified cellulose fiber (A) and the rubber component (C), depending on the composition of the dispersing polymer (B), and, accordingly, the modified cellulose fiber (A) is insufficiently dispersed, with the result that the rubber composition may fail to simultaneously achieve excellent rigidity, excellent tensile properties, and low energy loss.

The dispersing polymer (B) is any polymer having the above-described softening point range. Examples include petroleum resins, coal resins, terpene resins, and rosin resins. The dispersing polymer (B) is preferably at least one selected from the group consisting of petroleum resins and coal resins, among these. The use of a specific resin which is at least one selected from the group consisting of petroleum resins and coal resins as a dispersing polymer in mixing the modified cellulose fiber (A) with rubber can further improve the dispersibility of the cellulose fiber in rubber, with the result that the rubber composition can more suitably simultaneously achieve excellent rigidity, excellent tensile properties, and low energy loss. The dispersing polymer (B) is particularly preferably a petroleum resin.

Examples of the petroleum resin include C5 petroleum resins, C9 petroleum resins, C5/C9 petroleum resins, dicyclopentadiene resin, hydrides of the foregoing resins, and modified products of the foregoing resins obtained by (graft) addition of cyclic polybasic acid anhydrides (for example, maleic anhydride). Preferred among these are C9 petroleum resins.

Examples of the coal resin include coumarone resin, coumarone-indene resin, hydrides of the foregoing resins, modified products of the foregoing resins obtained by (graft) addition of cyclic polybasic acid anhydrides (for example, maleic anhydride).

Examples of the terpene resin include α-pinene resin, β-pinene resin, terpene phenolic resin, aromatic modified terpene resins, hydrides of the foregoing resins, and modified products of the foregoing resins obtained by addition of maleic anhydride.

Examples of the rosin resin include gum rosin, wood rosin, tall rosin, hydrogenated rosins prepared from the foregoing rosins, disproportionated rosins, maleic acid-modified rosins, fumaric acid-modified rosins, (meth)acrylic acid-modified rosins, esterified rosins obtained by condensation with alcohols, and phenol-modified rosins.

Among these, the dispersing polymer (B) is particularly preferably a petroleum resin. In view of compatibility, the modified cellulose fiber-containing rubber composition of the present invention most preferably contains a modified cellulose fiber modified by an acid anhydride group-containing petroleum resin as the modified cellulose fiber (A) and a petroleum resin as the dispersing polymer (B).

Non-limiting examples of the rubber component (C) used in the present invention include rubbers commonly used in the rubber industry, including, for example, natural rubber (NR), modified natural rubbers, and synthetic rubbers such as diene rubbers, e.g. polyisoprene rubber (IR), polybutadiene rubber (BR), styrene-butadiene rubber (SBR), styrene-isoprene-butadiene rubber (SIBR), acrylonitrile butadiene rubber (NBR), or chloroprene rubber (CR), and butyl-based rubbers, e.g. halogenated butyl rubbers (X-IIR) or butyl rubber (IIR). The synthetic rubbers may be modified ones. Examples of the modified natural rubber include epoxidized natural rubber (ENR) and hydrogenated natural rubber. The rubber component may be one or a combination of two or more of these rubbers.

Thus, it is another suitable embodiment of the present invention that the rubber component (C) is at least one selected from the group consisting of natural rubber, modified natural rubbers, synthetic rubbers, and modified synthetic rubbers.

In order to reduce energy loss, the rubber component (C) is preferably natural rubber, modified natural rubber, polybutadiene rubber, or styrene-butadiene rubber, more preferably natural rubber, polybutadiene rubber, or styrene-butadiene rubber, still more preferably styrene-butadiene rubber or a combination of natural rubber and polybutadiene rubber.

Any natural rubber may be used, including those commonly used in the tire industry, such as SIR20, RSS#3, or TSR20.

Non-limiting examples of the polybutadiene rubber include high-cis content polybutadiene rubber such as BR1220 available from Zeon Corporation, and BR130B and BR150B available from Ube Industries, Ltd.; and polybutadiene rubber containing syndiotactic polybutadiene crystals such as VCR412 and VCR617 available from Ube Industries, Ltd. In particular, in view of energy loss, the polybutadiene rubber preferably has a cis content of 90% by mass or more.

Non-limiting examples of the styrene-butadiene rubber include emulsion-polymerized styrene-butadiene rubber (E-SBR), solution-polymerized styrene-butadiene rubber (S-SBR), and modified E-SBR or S-SBR. Among these, E-SBR is preferred because it allows carbon black, cellulose fibers, and the like to disperse well and provides good processability.

The modified SBR may be used when the rubber composition incorporates silica to place more importance on fuel economy. In this case, examples of the modified SBR include SBR whose chain end and/or backbone is modified, and modified SBR (e.g. condensates, those having a branched structure) obtained by coupling with tin or silicon compounds or the like.

The amounts of rubbers in the rubber component (C) are not particularly limited and may be chosen appropriately.

The modified cellulose fiber-containing rubber composition of the present invention preferably contains the modified cellulose fiber (A) in an amount of 0.01 to 30 parts by mass relative to 100 parts by mass of the rubber component (C). When the amount of the modified cellulose fiber (A) in the modified cellulose fiber-containing rubber composition of the present invention is less than 0.01 parts by mass relative to 100 parts by mass of the rubber component (C), the effects of the present invention may be insufficiently achieved, while when the modified cellulose fiber (A) is incorporated in an amount of more than 30 parts by mass relative to 100 parts by mass of the rubber component (C), the modified cellulose fiber (A) may have extremely reduced dispersibility in the rubber composition, with the result that the rubber composition may fail to simultaneously achieve excellent rigidity, excellent tensile properties, and low energy loss. The amount of the modified cellulose fiber (A) in the modified cellulose fiber-containing rubber composition of the present invention is more preferably 0.05 parts by mass or more, still more preferably 0.1 parts by mass or more, but more preferably 20 parts by mass or less, still more preferably 15 parts by mass or less, most preferably 10 parts by mass or less, relative to 100 parts by mass of the rubber component (C).

The modified cellulose fiber-containing rubber composition of the present invention preferably contains the dispersing polymer (B) in an amount of 0.01 to 30 parts by mass relative to 100 parts by mass of the rubber component (C). When the amount of the dispersing polymer (B) in the modified cellulose fiber-containing rubber composition of the present invention is less than 0.01 parts by mass relative to 100 parts by mass of the rubber component (C), the effects of the present invention may be insufficiently achieved, while when the dispersing polymer (B) is incorporated in an amount of more than 30 parts by mass relative to 100 parts by mass of the rubber component (C), the percentage of the dispersing polymer (B) in the rubber composition may be excessively large, with the result that the rubber composition may fail to simultaneously achieve excellent rigidity, excellent tensile properties, and low energy loss. The amount of the dispersing polymer (B) in the modified cellulose fiber-containing rubber composition of the present invention is more preferably 0.05 parts by mass or more, still more preferably 0.1 parts by mass or more, particularly preferably 3 parts by mass or more, but more preferably 20 parts by mass or less, still more preferably 15 parts by mass or less, most preferably 10 parts by mass or less, relative to 100 parts by mass of the rubber component (C).

The ratio of the dispersing polymer (B) relative to the modified cellulose fiber (A) in the modified cellulose fiber-containing rubber composition of the present invention is preferably 30% to 70% by mass based on 100% by mass in total of the modified cellulose fiber (A) and the dispersing polymer (B). When the ratio of the dispersing polymer (B) relative to the modified cellulose fiber (A) falls within the above range, the dispersibility of the cellulose fiber in rubber can be further improved, with the result that the rubber composition can more suitably simultaneously achieve excellent rigidity, excellent tensile properties, and low energy loss. The ratio of the dispersing polymer (B) relative to the modified cellulose fiber (A) is more preferably 35% to 65% by mass, still more preferably 40% to 60% by mass, based on 100% by mass in total of the modified cellulose fiber (A) and the dispersing polymer (B).

The modified cellulose fiber-containing rubber composition of the present invention can be obtained by kneading the modified cellulose fiber (A), the dispersing polymer (B), and the rubber component (C), and optionally other later-mentioned compounding agents in for example a rubber kneading machine or the like using conventionally known method and conditions. In particular, preferably, the modified cellulose fiber (A) is preliminarily kneaded with the dispersing polymer (B) before kneading with the rubber component (C) and other compounding agents, and the kneaded mixture (resin composition) is kneaded with the rubber component (C) and other compounding agents. By preliminarily kneading the modified cellulose fiber (A) with the dispersing polymer (B) to prepare a resin composition, the modified cellulose fiber (A) can be made much finer and therefore the dispersibility of the cellulose fiber in rubber can be further improved and the rubber composition can simultaneously achieve excellent rigidity, excellent tensile properties, and low energy loss at higher levels. Thus, it is another suitable embodiment of the present invention that the modified cellulose fiber-containing rubber composition of the present invention is obtained by kneading the modified cellulose fiber (A) with the dispersing polymer (B) to give a kneaded mixture (resin composition), and kneading the kneaded mixture with the rubber component (C).

Another aspect of the present invention is a method for producing a modified cellulose fiber-containing rubber composition containing a modified cellulose fiber (A), a dispersing polymer (B), and a rubber component (C), wherein the modified cellulose fiber (A) is obtained by adding a C15 or higher cyclic polybasic acid anhydride (a) containing a hydrophobic group to a cellulose fiber through esterification; the dispersing polymer (B) has a softening point of 135° C. or lower; and the production method includes the step of kneading the modified cellulose fiber (A), the dispersing polymer (B), and the rubber component (C). It is still another suitable embodiment of the present invention that the production method includes the steps of kneading the modified cellulose fiber (A) with the dispersing polymer (B) to give a kneaded mixture, and kneading the kneaded mixture with the rubber component (C) to give a modified cellulose fiber-containing rubber composition.

As described above, the modified cellulose fiber-containing rubber composition of the present invention is preferably obtained by kneading the modified cellulose fiber (A) with the dispersing polymer (B) to give a kneaded mixture (resin composition), and kneading the kneaded mixture with the rubber component (C). The percentage of the modified cellulose fiber (A) from the resin composition per 100% by mass of the modified cellulose fiber (A) contained in the modified cellulose fiber-containing rubber composition of the present invention is more preferably 40% by mass or more, still more preferably 60% by mass or more, particularly preferably 80% by mass or more. The upper limit of the percentage is not particularly limited and may be 100% by mass. The percentage of the dispersing polymer (B) from the resin composition per 100% by mass of the dispersing polymer (B) contained in the modified cellulose fiber-containing rubber composition of the present invention is more preferably 40% by mass or more, still more preferably 60% by mass or more, particularly preferably 80% by mass or more. The upper limit of the percentage is not particularly limited and may be 100% by mass.

As described above, when the modified cellulose fiber (A) is preliminarily kneaded with the dispersing polymer (B), the step of kneading the modified cellulose fiber (A) with the dispersing polymer (B) may be carried out by any method that can knead the modified cellulose fiber (A) with the dispersing polymer (B), including conventional kneading methods. For example, the kneading step is preferably such that in a kneading machine, the modified cellulose fiber (A) is dispersed in the dispersing polymer (B) and stirred and mixed under a high shear force so that the modified cellulose fiber (A) is made finer. Non-limiting examples of kneading machines that can be used in the kneading step include two-roll mills, three-roll mills, single-screw kneading extruders, twin-screw kneading extruders, Banbury mixers, and pressure kneaders. Each of these kneading machines may be used alone, or two or more types of these kneading machines may be used in combination. In order to promote making the modified cellulose fiber (A) finer, it is preferred to use a twin-screw kneading extruder, a Banbury mixer, or a pressure kneader.

The kneading conditions in the step of kneading the modified cellulose fiber (A) with the dispersing polymer (B), such as kneading temperature and kneading time, may be chosen appropriately so that the modified cellulose fiber (A) is sufficiently kneaded with the dispersing polymer (B) to make the modified cellulose fiber (A) finer.

In the step of kneading the modified cellulose fiber (A) with the dispersing polymer (B), some of other compounding agents that can be added to the modified cellulose fiber-containing rubber composition of the present invention, lubricants such as stearic acid, antioxidants, or the like may be added in addition to the modified cellulose fiber (A) and the dispersing polymer (B), as long as they do not inhibit the progress of making the modified cellulose fiber (A) finer. The combined amount of the modified cellulose fiber (A) and the dispersing polymer (B), based on 100% by mass of the kneaded mixture (resin composition) obtained by the kneading step, is preferably 80% by mass or more, more preferably 90% by mass or more, still more preferably 93% by mass or more, particularly preferably 95% by mass or more. The upper limit of the combined amount is not particularly limited and may be 100% by mass.

The addition of the lubricant to the extent that does not affect the effects of the present invention facilitates the separation of the kneaded mixture of the modified cellulose fiber (A) and the dispersing polymer (B) from the kneading machine or die, so that formability or workability may be improved in some cases. Non-limiting examples of the lubricant include hydrocarbon lubricants such as paraffin wax or polyethylene wax; fatty acid lubricants such as stearic acid, behenic acid, or 12-hydroxystearic acid; and aliphatic amide lubricants such as stearic acid amide, oleic acid amide, or erucic acid amide. When a lubricant is added to the resin composition, for example, as in the case of a resin composition containing the modified cellulose fiber (A), the dispersing polymer (B), a lubricant, and other compounding agents, the amount of the lubricant relative to 100% by mass of the total resin composition is preferably 1% by mass or more, more preferably 3% by mass or more, and is also preferably 20% by mass or less, more preferably 10% by mass or less, particularly preferably 7% by mass or less.

The addition of the antioxidant to the extent that does not affect the effects of the present invention may in some cases slow down thermal aging of the modified cellulose fiber in the step of kneading the modified cellulose fiber (A) with the dispersing polymer (B). Non-limiting examples of the antioxidant include phenolic antioxidants such as ADK STAB AO series available from Adeka Corporation, e.g. AO-20, AO-30, AO-40, AO-50, or AO-60. When an antioxidant is added to the resin composition, for example, as in the case of a resin composition containing the modified cellulose fiber (A), the dispersing polymer (B), an antioxidant, and other compounding agents, the amount of the antioxidant relative to 100% by mass of the total resin composition is preferably 0.1% by mass or more, more preferably 0.5% by mass or more, and is also preferably 10% by mass or less, more preferably 3% by mass or less.

The modified cellulose fiber-containing rubber composition of the present invention may contain other components as long as it contains the modified cellulose fiber (A), the dispersing polymer (B), and the rubber component (C) and the effects of the present invention are not impaired. For example, resins having a softening point of higher than 135° C. which do not correspond to the dispersing polymer (B) may be used in admixture with the dispersing polymer (B). When such a resin is used in admixture with the dispersing polymer (B), the amount of the resin based on the combined amount of the resin and the dispersing polymer (B) is preferably 50% by mass or less.

In addition to the modified cellulose fiber (A), the dispersing polymer (B), and the rubber component (C), the modified cellulose fiber-containing rubber composition of the present invention may optionally incorporate other compounding agents conventionally used in the rubber industry, including, for example, reinforcing agents such as carbon black or silica, oil, age resisters, zinc oxide, stearic acid, silane coupling agents, curable resins, wax, vulcanizing agents, and vulcanization accelerators.

Non-limiting examples of carbon black that may be incorporated in the modified cellulose fiber-containing rubber composition of the present invention include GPF, FEF, HAF, ISAF, and SAF. The above carbon black may be used alone or in combinations of two or more.

The carbon black preferably has a nitrogen adsorption specific surface area ($N_2SA$) of 30 $m^2/g$ or more, more preferably 60 $m^2/g$ or more, but preferably 300 $m^2/g$ or less, more preferably 250 $m^2/g$ or less, still more preferably 200 $m^2/g$ or less. The carbon black with a $N_2SA$ of less than 30 $m^2/g$ may fail to produce a sufficient reinforcing effect. When the carbon black has a $N_2SA$ of more than 300 $m^2/g$, rolling resistance properties tend to deteriorate. The nitrogen adsorption specific surface area of carbon black is determined in accordance with the method A of JIS K 6217.

In the case of the modified cellulose fiber-containing rubber composition of the present invention incorporating carbon black, the amount of the carbon black relative to 100 parts by mass of the rubber component (C) is preferably 1 part by mass or more, more preferably 5 parts by mass or more, and is also preferably 150 parts by mass or less, more preferably 100 parts by mass or less, still more preferably 80 parts by mass or less. An amount of less than 1 part by mass may not provide a sufficient reinforcing effect or sufficient electric conductivity, while an amount of more than 150 parts by mass tends to deteriorate dispersibility or processability.

Oil may be added to the modified cellulose fiber-containing rubber composition of the present invention. The addition of oil improves processability and enhances rubber strength. Examples of the oil include process oils, vegetable fats and oils, and mixtures thereof. Examples of process oils include paraffinic process oil, aromatic process oil, and naphthenic process oil. Specific examples of the paraffinic process oil include PW-32, PW-90, PW-150, and PS-32 all available from Idemitsu Kosan Co., Ltd. Specific examples of the aromatic process oil include AC-12, AC-460, AH-16, AH-24, and AH-58 all available from Idemitsu Kosan Co., Ltd. Examples of vegetable fats and oils include castor oil, cotton seed oil, linseed oil, rapeseed oil, soybean oil, palm oil, coconut oil, peanuts oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. Among these, paraffinic process oil or aromatic process oil is suitable because of their advantages in terms of processability.

In the case of the modified cellulose fiber-containing rubber composition of the present invention incorporating oil, the amount of the oil relative to 100 parts by mass of the rubber component (C) is preferably 1 part by mass or more, more preferably 5 parts by mass or more, still more preferably 15 parts by mass or more, particularly preferably 30 parts by mass or more. An amount of less than 1 part by mass may not sufficiently provide the processability-improving effect. The amount of the oil is also preferably 60 parts by mass or less, more preferably 50 parts by mass or less, still more preferably 40 parts by mass or less. An amount of more than 60 parts by mass may increase the burden on the process.

Examples of age resisters which may be incorporated in the modified cellulose fiber-containing rubber composition of the present invention include diphenylamine age resisters such as p-(p-toluenesulfonylamide)-diphenylamine or octylated diphenylamine; and p-phenylenediamine age resisters such as N-(1,3-dimethylbutyl)-N'-phenyl-p-phenylenediamine (6PPD), N-phenyl-N'-isopropyl-p-phenylenediamine (IPPD), or N,N'-di-2-naphthyl-p-phenylenediamine.

Examples of vulcanization accelerators which may be incorporated in the modified cellulose fiber-containing rubber composition of the present invention include thiazole vulcanization accelerators such as 2-mercaptobenzothiazole, dibenzothiazyl disulfide, or N-cyclohexyl-2-benzothiazylsulfenamide; thiuram vulcanization accelerators such as tetramethylthiuram monosulfide or tetramethylthiuram disulfide; sulfenamide vulcanization accelerators such as N-cyclohexyl-2-benzothiazole sulfenamide, N-t-butyl-2-benzothiazole sulfenamide, N-oxyethylene-2-benzothiazole sulfenamide, or N,N'-diisopropyl-2-benzothiazole sulfenamide; and guanidine vulcanization accelerators such as diphenylguanidine, di-ortho-tolylguanidine, or ortho-tolylbiguanidine. The amount of vulcanization accelerator relative to 100 parts by mass of the rubber component (C) is preferably 0.1 to 5 parts by mass, more preferably 0.2 to 3 parts by mass.

The modified cellulose fiber-containing rubber composition of the present invention may suitably incorporate sulfur as a vulcanizing agent. Examples of the sulfur include powdered sulfur, precipitated sulfur, colloidal sulfur, insoluble sulfur, and highly dispersible sulfur. The amount of sulfur relative to 100 parts by mass of the rubber component (C) is preferably 1 part by mass or more, more preferably 1.5 parts by mass or more. When the amount is less than 1 part by mass, the effect of sulfur may be small. Also, the amount is preferably 6 parts by mass or less, more preferably 4 parts by mass or less. When the amount exceeds 6 parts by mass, the effect of suppressing hardening deterioration may be insufficient.

The modified cellulose fiber-containing rubber composition of the present invention can be prepared by usual methods. Specifically, it can be prepared by kneading the components using a rubber kneading machine, such as a Banbury mixer, a kneader, or an open roll mill, and vulcanizing the kneaded mixture.

The modified cellulose fiber-containing rubber composition of the present invention can be used for tires. Thus, another aspect of the present invention relates to a modified cellulose fiber-containing rubber composition for tires including the modified cellulose fiber-containing rubber composition of the present invention. Further another aspect of the present invention relates to a tire formed from the modified cellulose fiber-containing rubber composition of the present invention.

The tire of the present invention can be produced from the modified cellulose fiber-containing rubber composition by conventional methods. Specifically, the modified cellulose fiber-containing rubber composition of the present invention, before vulcanization, is extruded into the shape of a tire component and assembled with other tire components on a tire building machine in a conventional manner to build an unvulcanized tire. The unvulcanized tire is heated and pressurized in a vulcanizer, thereby providing a tire of the present invention.

The tire of the present invention may be, for example, a pneumatic tire, a studless winter tire, or a run-flat tire, and especially suitably a pneumatic tire.

EXAMPLES

Examples of the present invention are described below. The present invention is not limited to the examples.

The following describes the measurement of physical properties performed in some of the examples.

(1) Monitoring of Progress of Modification Reaction

The progress of modification reactions was observed using a Fourier transform infrared spectrometer "Spectrum one" available from Perkin Elmer. Specifically, the intensity of the peak associated with the stretching vibration of the carbonyl carbon and oxygen in the ester bond between 1,650 and 1,750 cm$^{-1}$, which increases along with the progress of the modification reaction, was qualitatively monitored.

(2) Measurement of the Ratio of Acid Anhydride Added to Cellulose Fiber

The addition ratio was calculated from the change in the mass of the cellulose fiber before and after modification according to the equation (I) below. The sample to be evaluated for addition ratio was washed with a sufficient amount of a solvent before the measurement. A good solvent for the acid anhydride was selected appropriately as the solvent for washing.

$$Wp = (W - Ws) \times 100 / Ws \qquad (I)$$

Wp: Ratio (% by mass) of acid anhydride added to cellulose fiber

W: Dry mass (g) of cellulose fiber after modification (modified cellulose fiber)

Ws: Dry mass (g) of cellulose fiber before modification (3) Measurement of Solid Content The solid content was measured using an infrared moisture balance ("FD-620" available from Kett Electric Laboratory).

(4) Measurement of Acid Value

The acid value of the acid anhydride was measured by the following procedure.

An amount of 0.5 g of the acid anhydride was weighed and dissolved in 50 mL of tetrahydrofuran. To the solution was added ten drops of a 1% solution of phenolphthalein in ethanol to give an acid anhydride solution. A 0.5 N solution of potassium hydroxide in ethanol was dropwise added to the acid anhydride solution with stirring to color the reaction system. A point at which the color no longer changed for 30 seconds without dropping the potassium hydroxide solution was taken as the end point. The acid value (mg KOH/g) was calculated from the mass of the potassium hydroxide solution added until the end point according to the following equation (II).

$$\text{Acid value} = Wk \times 56.1 \tag{II}$$

Wk: Mass (g) of 0.5 N potassium hydroxide solution added until end point

[Preparation of Modified Cellulose Fiber (A-1)]

An amount of 250.00 g (solids: 50.00 g) of a water-wet needle bleached kraft pulp (hereinafter, referred to as NBKP) and 200.00 g of N-methylpyrrolidone were charged into a 2,000-mL vessel, and the water was evaporated off to give a solvent-replaced NBKP. The temperature inside the system was adjusted to 70° C., and 39.75 g of hexadecenylsuccinic anhydride as an acid anhydride (a) and 8.53 g of potassium carbonate as a catalyst for esterification were introduced into the system and reacted for 2 hours. The reaction product was washed sequentially with ethanol, acetic acid, and water, followed by replacing the solvent with ethanol. The resulting product was dried to give a modified cellulose fiber A-1. Ethanol was used as a solvent for washing the sample to be evaluated for addition ratio. The ratio of the acid anhydride (a) added to the cellulose fiber in the modified cellulose fiber A-1 was 59.6% by mass.

[Synthesis of Acid Anhydride Group-Containing Petroleum Resin (a-1)]

An amount of 1,200.00 g of Petrotack 70 (available from Tosoh Corporation, C5/C9 petroleum resin, weight average molecular weight: 1,300, softening point: 70° C., bromine value: 45 $Br_2$/100 g) was introduced into a 3,000-mL separable flask, and heated to 160° C. so that it was molten. While the temperature inside the system was maintained at 160° C., the system was purged with nitrogen, and then 221.00 g of maleic anhydride and 6.00 g of t-butyl peroxide were introduced in 12 aliquots over 3 hours. Two hours after the completion of the introduction, the temperature inside the system was adjusted to 180° C. and the system was maintained under reduced pressure for 2 hours to evaporate off unreacted maleic anhydride. As a result of this purification procedure, an acid anhydride group-containing petroleum resin a-1 having an acid value of 98, a softening point of 96° C., and a weight average molecular weight of 5,800 was obtained.

[Preparation of Modified Cellulose Fiber (A-2)]

An amount of 250.00 g (solids: 50.00 g) of a water-wet NBKP and 200.00 g of N-methylpyrrolidone were charged into a 2,000-mL vessel, and the water was evaporated off to give a solvent-replaced NBKP. The temperature inside the system was adjusted to 75° C., and 50.00 g of the acid anhydride group-containing petroleum resin a-1 was weighed and introduced as an acid anhydride (a) together with 8.53 g of potassium carbonate as a catalyst for esterification and they were reacted for 3 hours. The reaction product was washed sequentially with acetic acid, water, and ethanol, followed by drying to give a modified cellulose fiber A-2. Tetrahydrofuran was used as a solvent for washing the sample to be evaluated for addition ratio. The ratio of the acid anhydride group-containing petroleum resin a-1 added to the cellulose fiber in the modified cellulose fiber A-2 was 36% by mass.

Preparation of Modified Cellulose Fiber-Containing Resin Composition

Preparation Example 1

Quintone R100 (available from Zeon Corporation, C5 petroleum resin, weight average molecular weight: 2,250, softening point: 96° C.) as a dispersing polymer (B), the modified cellulose fiber A-1, stearic acid (stearic acid beads "Tsubaki" available from NOF Corporation) as a lubricant, and AO-60 (available from Adeka Corporation, phenolic antioxidant) as an antioxidant were introduced into a twin-screw kneader ("KZW" available from Technovel Corporation, screw diameter: 15 mm, L/D: 45) according to the proportions shown in Table 1 below, followed by melt-kneading to give a modified cellulose fiber-containing resin composition C-1.

Preparation Example 2

A modified cellulose fiber-containing resin composition C-2 was prepared as in Preparation Example 1, except that Petcoal LX (available from Tosoh Corporation, C9 petroleum resin, weight average molecular weight: 1,400, softening point: 98° C.) was used as the dispersing polymer (B).

Preparation Example 3

Petcoal LX (available from Tosoh Corporation, C9 petroleum resin, weight average molecular weight: 1,400, softening point: 98° C.) and the acid anhydride group-containing petroleum resin a-1 (acid value: 98, softening point: 96° C., weight average molecular weight: 5,800) as dispersing polymers (B), the modified cellulose fiber A-2, stearic acid (stearic acid beads "Tsubaki" available from NOF Corporation) as a lubricant, and AO-60 (available from Adeka Corporation, phenolic antioxidant) as an antioxidant were introduced into a twin-screw kneader ("KZW" available from Technovel Corporation, screw diameter: 15 mm, L/D: 45) according to the proportions shown in Table 1 below, followed by melt-kneading to give a modified cellulose fiber-containing resin composition C-3.

Preparation Example 4

A modified cellulose fiber-containing resin composition C-4 was prepared as in Preparation Example 1, except that no dispersing polymer (B) was used and the other materials were compounded according to the proportions shown in Table 1 below.

Preparation Example 5

A resin composition consisting only of Quintone R100 was used as a resin composition C-5.

Preparation Example 6

A resin composition consisting only of Petcoal LX was used as a resin composition C-6.

The Table 1 below shows the formulations of the resin compositions C-1 to C-6.

Sulfur: Seimi Sulfur (oil content: 10%) available from Nippon Kanryu Industry Co., Ltd.

Vulcanization accelerator: NOCCELER CZ (N-cyclohexyl-2-benzothiazole sulfenamide) available from Ouchi Shinko Chemical Industrial Co., Ltd.

TABLE 1

| | Modified cellulose fiber (A) | | | Dispersing polymer (B) | | | Other components | |
|---|---|---|---|---|---|---|---|---|
| | Modified cellulose fiber | | | | | Acid anhydride | | |
| | | | Modifier | | | group-containing | | |
| | Type | Cellulose content (% by mass) | component content (% by mass) | Quintone R100 (% by mass) | Petcoal LX (% by mass) | petroleum resin a-1 (% by mass) | Stearic acid (% by mass) | AO-60 (% by mass) |
| C-1 | A-1 | 46.5 | 29.1 | 17.4 | 46.5 | — | — | 6.0 | 1.0 |
| C-2 | A-1 | 46.5 | 29.1 | 17.4 | — | 46.5 | — | 6.0 | 1.0 |
| C-3 | A-2 | 40.8 | 30.0 | 10.8 | — | 43.2 | 9.0 | 6.0 | 1.0 |
| C-4 | A-1 | 93.0 | 58.3 | 34.7 | — | — | — | 6.0 | 1.0 |
| C-5 | — | — | — | — | 100.0 | — | — | — | — |
| C-6 | — | — | — | — | — | 100.0 | — | — | — |

In Table 1, the term "Cellulose content" in the examples using modified cellulose fibers refers to the cellulose fiber content in the modified cellulose fiber and is expressed as an amount (% by mass) based on 100% by mass of the resin composition. The term "Modifier component content" refers to the cyclic polybasic acid anhydride (a) content in the modified cellulose fiber and is expressed as an amount (% by mass) based on 100% by mass of the resin composition.

The trade names and codes used in Table 1 are specified below.

Quintone R100: C5 petroleum resin, weight average molecular weight: 2,250, softening point: 96° C., available from Zeon Corporation Petcoal LX: C9 petroleum resin, weight average molecular weight: 1,400, softening point: 98° C., available from Tosoh Corporation Stearic acid: Stearic acid beads "Tsubaki" available from NOF Corporation AO-60: Phenolic antioxidant available from Adeka Corporation Chemicals used in examples and comparative examples are listed below.

Natural rubber: TSR20

Polybutadiene rubber: BR150B (cis content: 97% by mass, $ML_{1+4}$ (100° C.): 40) available from Ube Industries, Ltd.

Styrene-butadiene rubber: Nipol 1502 (E-SBR, styrene content: 23.5% by mass, vinyl content: 18% by mass) available from Zeon Corporation C-1 to C-6: Resin compositions C-1 to C-6 prepared in Preparation Examples 1 to 6

Carbon black: Shoblack N550 ($N_2SA$: 42 m²/g) available from Cabot Japan K.K.

Oil: Diana Process AH-24 available from Idemitsu Kosan Co., Ltd.

Age resister: Nocrac 6C (N-phenyl-N'-(1,3-dimethylbutyl)-p-phenylenediamine, 6PPD) available from Ouchi Shinko Chemical Industrial Co., Ltd.

Zinc oxide: Zinc oxide #2 available from Mitsui Mining and Smelting Co., Ltd.

Stearic acid: Stearic acid beads "Tsubaki" available from NOF Corporation

Examples 1 to 6, Comparative Examples 1 to 7

According to the formulations shown in Table 2 or 3, the chemicals other than the sulfur and the vulcanization accelerator were kneaded using a 1.7-L Banbury mixer available from Kobe Steel, Ltd. to give a kneaded mixture. Next, the sulfur and the vulcanization accelerator were added to the kneaded mixture and kneaded together using a roll mill to give an unvulcanized rubber composition. The unvulcanized rubber composition was press-vulcanized at 170° C. for 12 minutes to give a vulcanized rubber composition.

The unvulcanized rubber compositions and vulcanized rubber compositions prepared as above were evaluated on the following items. Tables 2 and 3 show the results.

<Fiber Dispersibility>

The shear modulus G* of the unvulcanized rubber compositions was measured at a temperature of 100° C., a frequency of 0.1 Hz, and a dynamic strain of 1% or 64% using an RPA2000 analyzer available from Alpha Technologies. The degree of fiber dispersion was calculated from the shear moduli according to the following equation (III).

$$\text{(Degree of fiber dispersion)} = (G^*[1\%] - G^*[64\%])/G^*[64\%] \qquad \text{(III)}$$

G*[1%]: Shear modulus at 1% dynamic strain
G*[64%]: Shear modulus at 64% dynamic strain The degrees of fiber dispersion obtained in Examples 1, 2, 4, and 5 are expressed as an index using the equation below, with Comparative Example 2 set equal to 100. A higher index indicates better fiber dispersibility.

$$\text{(Fiber dispersibility index)} = \text{(Degree of fiber dispersion of Comparative Example 2)}/\text{(Degree of fiber dispersion of each formulation)} \times 100$$

Please note that fiber dispersibility was evaluated only for the rubber compositions containing 5 parts by mass of the modified cellulose fiber relative to 100 parts by mass of the rubber component.

The degree of fiber dispersion of Example 6 is expressed as an index using the equation below, with Comparative Example 7 set equal to 100. A higher index indicates better fiber dispersibility.

(Fiber dispersion index)=(Degree of fiber dispersion of Comparative Example 7)/(Degree of fiber dispersion of Example 6)×100

<Viscoelasticity Test>

Using a viscoelasticity spectrometer VES available from Iwamoto Seisakusho Co., Ltd., specimens cut out of the vulcanized rubber compositions were measured for complex elastic modulus $E^*a$ (MPa) in the tire circumferential direction and complex elastic modulus $E^*b$ (MPa) in the tire radial direction at a temperature of 70° C., a frequency of 10 Hz, an initial strain of 10%, and a dynamic strain of 2%. The tire circumferential direction means the direction along which the vulcanized rubber compositions were extruded; and the tire radial direction means the direction orthogonal to the extrusion direction. The moduli $E^*a$ or $E^*b$ obtained in Examples 1 to 5 and Comparative Examples 2 to 5 are expressed as an index using the equation below, with Comparative Example 1 set equal to 100. A higher index indicates higher rigidity and better handling stability.

(Elastic modulus $a$ index)=($E^*a$ of each formulation)/($E^*a$ of Comparative Example 1)×100

(Elastic modulus $b$ index)=($E^*b$ of each formulation)/($E^*b$ of Comparative Example 1)×100

The moduli $E^*a$ or $E^*b$ obtained in Example 6 and Comparative Example 7 are expressed as an index using the equation below, with Comparative Example 6 set equal to 100. A higher index indicates higher rigidity and better handling stability.

(Elastic modulus $a$ index)=($E^*a$ of each formulation)/($E^*a$ of Comparative Example 6)×100

(Elastic modulus $b$ index)=($E^*b$ of each formulation)/($E^*b$ of Comparative Example 6)×100

<Tensile Strength>

Tensile testing was performed using No. 3 dumbbell specimens prepared from the vulcanized rubber compositions in accordance with JIS K 6251 "Rubber, vulcanized or thermoplastics—Determination of tensile stress-strain properties" to measure the tensile strength at break (TB) of the vulcanized rubber compositions. The TB values obtained in Examples 1 to 5 and Comparative Examples 2 to 5 are expressed as an index using the equation below, with Comparative Example 1 set equal to 100. A higher index indicates better durability.

(Tensile strength index)=($TB$ of each formulation)/($TB$ of Comparative Example 1)×100

The TB values obtained in Example 6 and Comparative Example 7 are expressed as an index using the equation below, with Comparative Example 6 set equal to 100. A higher index indicates better durability.

(Tensile strength index)=($TB$ of each formulation)/($TB$ of Comparative Example 6)×100

<Rolling Resistance>

The tan δ of the vulcanized rubber composition of each formulation was measured at a temperature of 70° C., a frequency of 10 Hz, an initial strain of 10%, and a dynamic strain of 2% using a viscoelasticity spectrometer VES available from Iwamoto Seisakusho Co., Ltd. The tan δ values obtained in Examples 1 to 5 and Comparative Examples 2 to 5 are expressed as an index using the equation below, with Comparative Example 1 set equal to 100. A higher index indicates lower rolling resistance and better fuel economy.

(Fuel economy index)=(tan δ of Comparative Example 1)/(tan δ of each formulation)×100

The tan δ values obtained in Example 6 and Comparative Example 7 are expressed as an index using the equation below, with Comparative Example 6 set equal to 100. A higher index indicates lower rolling resistance and better fuel economy.

(Fuel economy index)=(tan δ of Comparative Example 6)/(tan δ of each formulation)×100

<Tire Property Balance Index>

A balance index was calculated from the above indexes according to the equation below. A higher index indicates a better balance of handling stability, fuel economy, and durability.

(Balance index)=(Elastic modulus $a$ index)×(Tensile strength index)×(Fuel economy index)/10,000

TABLE 2

| | | Comparative Example 1 | Example 1 | Example 2 | Example 3 | Example 4 | Example 5 | Comparative Example 2 | Comparative Example 3 | Comparative Example 4 | Comparative Example 5 |
|---|---|---|---|---|---|---|---|---|---|---|---|
| Formulation (parts by mass) | Natural rubber | 70 | 70 | 70 | 70 | 70 | 70 | 70 | 70 | 70 | 70 |
| | Polybutadiene rubber | 30 | 30 | 30 | 30 | 30 | 30 | 30 | 30 | 30 | 30 |
| | C-1 | — | 10.75 | — | — | — | — | — | — | — | — |
| | C-2 | — | — | 10.75 | 21.5 | — | — | — | — | — | — |
| | C-3 | — | — | — | — | 12.25 | — | — | — | — | — |
| | C-4 | — | — | — | — | — | 5.38 | 5.38 | — | — | — |
| | C-5 | — | — | — | — | — | — | — | 5 | — | — |
| | C-6 | — | — | — | — | — | 5 | — | — | 5 | — |
| | Carbon black | 40 | 40 | 40 | 40 | 40 | 40 | 40 | 40 | 40 | 70 |
| | Oil | 5 | 5 | 5 | 5 | 5 | 5 | 5 | 5 | 5 | 5 |
| | Age resister | 2 | 2 | 2 | 2 | 2 | 2 | 2 | 2 | 2 | 2 |
| | Zinc oxide | 3 | 3 | 3 | 3 | 3 | 3 | 3 | 3 | 3 | 3 |
| | Stearic acid | 2 | 2 | 2 | 2 | 2 | 2 | 2 | 2 | 2 | 2 |
| | Sulfur | 2 | 2 | 2 | 2 | 2 | 2 | 2 | 2 | 2 | 2 |
| | Vulcanization accelerator | 1 | 1 | 1 | 1 | 1 | 1 | 1 | 1 | 1 | 1 |
| | Amount of modified cellulose fiber (parts by mass) | — | 5 | 5 | 10 | 5 | 5 | 5 | — | — | — |
| Evaluation | Fiber dispersibility | — | 122 | 125 | / | 134 | 108 | 100 | — | — | — |
| | Elastic modulus a in circumferential direction | 100 | 180 | 197 | 348 | 200 | 195 | 195 | 83 | 93 | 195 |

TABLE 2-continued

|  | Comparative Example 1 | Example 1 | Example 2 | Example 3 | Example 4 | Example 5 | Comparative Example 2 | Comparative Example 3 | Comparative Example 4 | Comparative Example 5 |
|---|---|---|---|---|---|---|---|---|---|---|
| Elastic modulus b in radial direction | 100 | 120 | 123 | 155 | 129 | 105 | 101 | 84 | 95 | 193 |
| Tensile strength | 100 | 85 | 83 | 78 | 80 | 86 | 80 | 80 | 90 | 68 |
| Fuel economy | 100 | 76 | 78 | 70 | 85 | 70 | 58 | 60 | 66 | 55 |
| Balance index | 100 | 116 | 128 | 190 | 136 | 117 | 90 | 40 | 55 | 73 |

TABLE 3

|  |  | Example 6 | Comparative Example 6 | Comparative Example 7 |
|---|---|---|---|---|
| Formulation (parts by mass) | Styrene-butadiene rubber | 100 | 100 | 100 |
|  | C-3 | 12.25 | — | — |
|  | C-4 | — | — | 5.38 |
|  | Carbon black | 40 | 40 | 40 |
|  | Oil | 5 | 5 | 5 |
|  | Age resister | 2 | 2 | 2 |
|  | Zinc oxide | 3 | 3 | 3 |
|  | Stearic acid | 2 | 2 | 2 |
|  | Sulfur | 2 | 2 | 2 |
|  | Vulcanization accelerator | 1 | 1 | 1 |
|  | Amount of modified cellulose fiber (parts by mass) | 5 | — | 5 |
| Evaluation | Fiber dispersibility | 140 | — | 100 |
|  | Elastic modulus a in circumferential direction | 213 | 100 | 195 |
|  | Elastic modulus b in radial direction | 135 | 100 | 102 |
|  | Tensile strength | 98 | 100 | 82 |
|  | Fuel economy | 93 | 100 | 60 |
|  | Balance index | 194 | 100 | 96 |

In Tables 2 and 3, the "Amount of modified cellulose fiber (parts by mass)" means the amount (parts by mass) of the modified cellulose fiber relative to 100 parts by mass of the rubber component in the rubber composition.

Tables 2 and 3 demonstrate that in rubber compositions containing: a modified cellulose fiber (A) obtained by adding a C15 or higher cyclic polybasic acid anhydride (a) containing a hydrophobic group to a cellulose fiber through esterification; a dispersing polymer (B) having a softening point of 135° C. or lower; and a rubber component (C), the dispersibility of the cellulose fiber in rubber was improved and excellent rigidity, excellent tensile properties, and low energy loss (rolling resistance) were simultaneously achieved. This proves that when pneumatic tires are formed from such rubber compositions, the resulting pneumatic tires have excellent handling stability, excellent rolling resistance properties, and excellent durability. The results further demonstrate that in such rubber compositions, the dispersibility of the cellulose fiber in rubber was improved so that excellent rigidity was achieved not only in the tire circumferential direction but also in the tire radial direction. This also proves that the resulting pneumatic tires have greatly excellent handling stability.

It can be considered that a large amount of carbon black may be incorporated in place of the cellulose fiber to enhance reinforcing properties. However, as shown in the results of Comparative Example 5, the incorporation of a large amount of carbon black can improve rigidity but fails to achieve a balanced improvement in rigidity, tensile properties, and rolling resistance properties.

The invention claimed is:

1. A modified cellulose fiber-containing rubber composition, comprising:
    a modified cellulose fiber (A) obtained by adding a C15 or higher cyclic polybasic acid anhydride (a) containing a hydrophobic group to a cellulose fiber through esterification;
    a dispersing polymer (B) having a softening point of 135° C. or lower; and
    a rubber component (C).

2. The modified cellulose fiber-containing rubber composition according to claim 1,
    wherein the cyclic polybasic acid anhydride (a) is at least one selected from the group consisting of acid anhydride group-containing petroleum resins and acid anhydride group-containing coal resins.

3. The modified cellulose fiber-containing rubber composition according to claim 1,
    wherein the dispersing polymer (B) is at least one selected from the group consisting of petroleum resins and coal resins.

4. The modified cellulose fiber-containing rubber composition according to claim 1,
    wherein the rubber component (C) is at least one selected from the group consisting of natural rubber, modified natural rubbers, synthetic rubbers, and modified synthetic rubbers.

5. The modified cellulose fiber-containing rubber composition according to claim 1,
    wherein the modified cellulose fiber-containing rubber composition comprises the modified cellulose fiber (A) in an amount of 0.01 to 30 parts by mass relative to 100 parts by mass of the rubber component (C).

6. The modified cellulose fiber-containing rubber composition according to claim 1,
wherein the modified cellulose fiber-containing rubber composition is obtained by the steps of:
kneading the modified cellulose fiber (A) with the dispersing polymer (B) to give a kneaded mixture, and
kneading the kneaded mixture with the rubber component (C).

7. A modified cellulose fiber-containing rubber composition for tires, comprising the modified cellulose fiber-containing rubber composition according to claim 1.

8. A pneumatic tire, formed from the modified cellulose fiber-containing rubber composition for tires according to claim 7.

\* \* \* \* \*